(12) United States Patent
Quinn et al.

(10) Patent No.: US 8,191,365 B2
(45) Date of Patent: Jun. 5, 2012

(54) INTERCOOLER SYSTEM FOR ENGINE AIR CHARGER

(75) Inventors: Richard D. Quinn, Clarkston, MI (US); Raymond C. Majcher, Howell, MI (US); Luke Sewell, Huntington Woods, MI (US); Li-Jen Peter Ho, Farmington Hills, MI (US); Charles J. Musienko, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 888 days.

(21) Appl. No.: 12/261,363

(22) Filed: Oct. 30, 2008

(65) Prior Publication Data

US 2010/0108039 A1 May 6, 2010

(51) Int. Cl.
- *F02B 29/04* (2006.01)
- *F02B 33/00* (2006.01)
- *F01P 7/14* (2006.01)
- *F01P 3/20* (2006.01)
- *F01P 3/00* (2006.01)

(52) U.S. Cl. .... 60/599; 123/563; 123/41.09; 123/41.51; 123/41.29

(58) Field of Classification Search ............... 60/599; 123/563, 41.51, 41.09, 41.29; F02B 29/04
See application file for complete search history.

(56) References Cited

U.S. PATENT DOCUMENTS

| | | | | | |
|---|---|---|---|---|---|
| 2,188,172 | A | * | 1/1940 | Brehob | 123/41.29 |
| 4,563,983 | A | * | 1/1986 | Hayashi et al. | 60/599 |
| 5,871,001 | A | * | 2/1999 | Pelkey | 123/563 |
| 6,196,167 | B1 | * | 3/2001 | Marsh et al. | 123/41.09 |
| 6,293,264 | B1 | * | 9/2001 | Middlebrook | 123/563 |
| 7,669,558 | B2 | * | 3/2010 | Claypole et al. | 123/41.51 |
| 2011/0107760 | A1 | * | 5/2011 | Quinn et al. | 60/599 |

FOREIGN PATENT DOCUMENTS

| | | | |
|---|---|---|---|
| DE | 3517567 A1 | * | 12/1985 |
| EP | 0081716 A1 | * | 6/1983 |
| JP | 60212616 A | * | 10/1985 |
| JP | 61065016 A | * | 4/1986 |
| JP | 62247122 A | * | 10/1987 |
| JP | 63012825 A | * | 1/1988 |
| JP | 2004239092 A | * | 8/2004 |

\* cited by examiner

*Primary Examiner* — Thai Ba Trieu

(57) ABSTRACT

An intercooler system and method of operation for use with an air charging system for an internal combustion engine is disclosed. The intercooler system may comprise an intercooler pump for pumping a coolant through the intercooler system, a first heat exchanger that transfers heat from charged intake air to the coolant, a second heat exchanger that transfers heat from the coolant to outside air, and an intercooler coolant reservoir that contains the coolant therein. Coolant lines direct a flow of the coolant through the intercooler pump, the first heat exchanger, the second heat exchanger and the intercooler coolant reservoir.

7 Claims, 2 Drawing Sheets

INTERCOOLER SYSTEM FOR ENGINE AIR CHARGER

BACKGROUND OF INVENTION

The present invention relates generally to intake air charging for an internal combustion engine, and more particularly to an intercooler circuit for the intake air charging system.

Some vehicles include intake air charging systems, such as superchargers or turbo chargers, in order to increase the air intake charge in the cylinders and thus boost the engine output. During an acceleration burst, the intake charge boost compresses the intake charge significantly, which raises its temperature dramatically. On some vehicles, an intercooler system is used to reduce the intake charge temperature in order to provide an even more dense intake air charge, thus maximize engine power. In such systems, the effectiveness of the intercooler directly affects the engine power output.

A desire exists, then, to improve the effectiveness of the intercooler. When an air-to-liquid intercooler heat exchanger (ICHE) is employed, the size of the ICHE may be increased to improve the effectiveness of the intercooler. Increasing the size of the ICHE, however, may restrict the air flow to a condenser, radiator, fan module (CRFM), which will adversely effect other vehicle cooling systems. Others have suggested employing a refrigerant system to improve intercooler effectiveness. However, this may be too costly and complex of a solution for particular vehicle applications.

SUMMARY OF INVENTION

An embodiment contemplates an intercooler system for use with an air charging system for an internal combustion engine. The intercooler system may comprise an intercooler pump for pumping a coolant through the intercooler system, a first heat exchanger configured to transfer heat from charged intake air to the coolant, a second heat exchanger configured to transfer heat from the coolant to outside air, and an intercooler coolant reservoir configured to contain the coolant therein. Coolant lines direct a flow of the coolant through the intercooler pump, the first heat exchanger, the second heat exchanger and the intercooler coolant reservoir.

An embodiment contemplates a method of cooling charged intake air entering an internal combustion engine, the method comprising the steps of: transferring heat from the charged intake air to a coolant flowing through a first heat exchanger; transferring heat from the coolant flowing through a second heat exchanger to surrounding air; pumping the coolant through an intercooler pump; and receiving, storing and discharging the coolant from an intercooler coolant reservoir.

An advantage of an embodiment is that the performance of a supercharged (or turbo charged) engine is improved by improving the intercooler system performance during periods of sustained air intake boost. The intercooler system performance is improved by providing an intercooler coolant reservoir, which adds additional short-term thermal capacity, and hence thermal inertia, to the intercooler system. As the intake charge typically only requires cooling under periods of sustained supercharger boost, the bulk temperature of the intercooler coolant is usually quite cool. Under periods of high boost, the additional coolant volume, which is stored in the reservoir, slows the rate of climb of the charge air temperature, reducing peak charge temperatures and allowing for a cooler, more dense intake charge and therefore higher available power levels. Moreover, the improved intercooler system performance is accomplished without increasing the size of the intercooler heat exchanger (ICHE) itself, which can degrade the cooling efficiency of condenser, radiator, fan module (CRFM) components due to additional airflow restrictions to the CRFM opening that would be caused by a larger ICHE.

DETAILED DESCRIPTION

Figure 1:
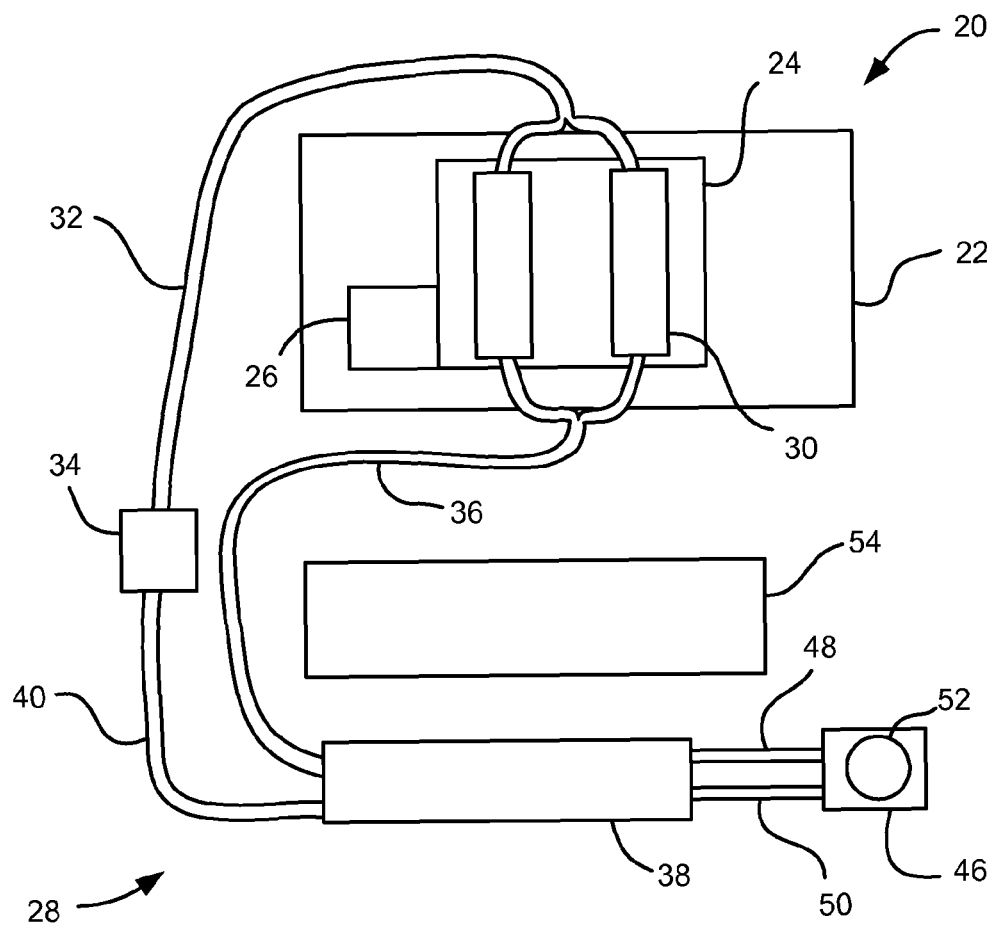
FIG. 1 is a schematic diagram illustrating a portion of a vehicle, including an intercooler system.
Figure 2:
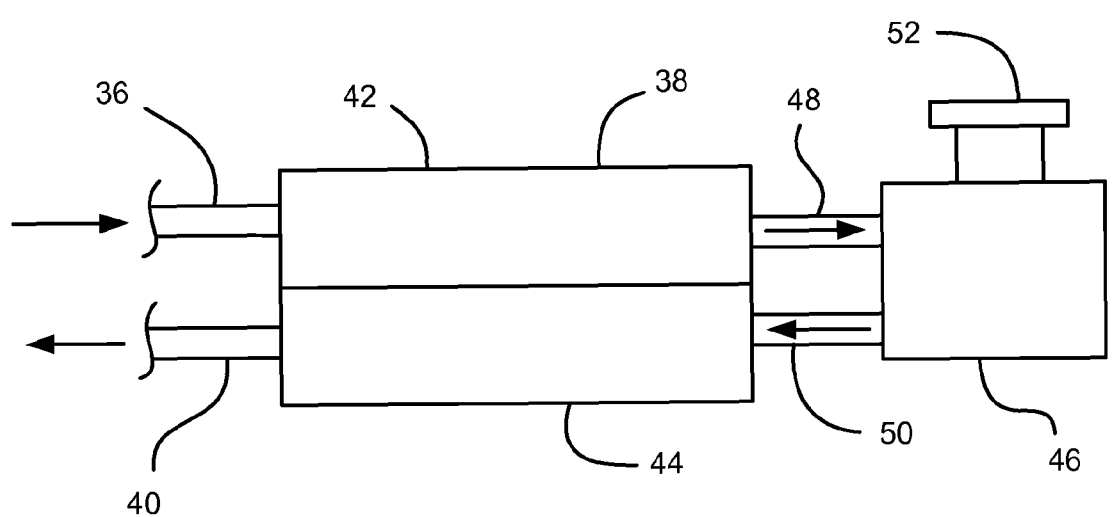
FIG. 2 is a schematic diagram showing a portion of the intercooler system.

Referring to FIGS. 1 and 2, a portion of a vehicle, indicated generally at 20, is shown. The vehicle 20 includes an internal combustion engine 22 having an intake manifold 24 that directs air into engine cylinders (not shown). An intake air charger 26, such as a supercharger or turbo charger, compresses an air charge and directs the compressed air charge into the intake manifold 24. In order to improve the performance of the intake air charger 26, an intercooler system 28 is employed.

The intercooler system 28 includes a pair of intercooler bricks (heat exchangers) 30 in the intake manifold 24, a pump-to-manifold coolant line 32 directing a coolant from an intercooler pump 34 to the intercooler bricks 30, a manifold-to-heat exchanger coolant line 36 directing the coolant from the bricks 30 to an upper portion 42 of an intercooler heat exchanger (ICHE) 38, and a heat exchanger-to-pump coolant line 40 directing the coolant from a lower portion 44 of the ICHE 38 to the intercooler pump 34. The coolant may be any type of liquid used for heat transfer, such as, for example a mixture of ethylene glycol and water. The coolant in the intercooler system 28 is separate from the engine cooling system, so coolant from the two systems does not intermix. The intercooler bricks 30 are liquid-to-air heat exchangers that extract heat from the charged intake air prior to the air entering the cylinders. The intercooler pump 34 is an electric pump that pumps coolant from the ICHE 38 to the intercooler bricks 30. The ICHE 38 is a liquid-to-air heat exchanger where heat is absorbed by air flowing through the ICHE 38.

The intercooler system 28 also includes an intercooler coolant reservoir 46. The reservoir 46 may be sized to hold, for example, about 1-4 liters of coolant, depending upon the particular vehicle intercooler system. Of course, the reservoir 46 may be sized to hold more or less coolant, if so desired. The reservoir 46 receives coolant from the upper portion 42 of the ICHE 38 via a heat exchanger-to-reservoir coolant line 48 and directs coolant, via a reservoir-to-heat exchanger coolant line 50, to the lower portion 44 of the ICHE 38. The reservoir 46 may include a fill cap 52 for adding coolant to the intercooler system 28. While the ICHE 38 may be mounted in front of an opening to a condenser, radiator, fan module (CRFM) 54, preferably the reservoir 46 is not in front of this opening so that it does not interfere with air flow into the CRFM 54.

Operation of the intercooler system 28 includes activating the intercooler pump 34, which pumps the coolant through the system. The coolant is pumped through the intercooler bricks 30, where the coolant absorbs heat from the charged intake air. The cooled intake air entering the cylinders is now more dense, allowing for more engine power output. The coolant, after absorbing heat from the charged intake air, then flows to the ICHE 38. The direction of coolant flow through the ICHE 38 and the reservoir 46 is indicated by the arrows in FIG. 2 (and FIGS. 3-4, discussed below). As the coolant flows through the upper portion 42 of the ICHE 42, air flows through the ICHE 42, absorbing heat from the coolant. The coolant then flows through the reservoir 46 and back to a lower portion 44 of the ICHE 42. Again, air absorbs heat from the coolant. The coolant then flows to the pump 34 to complete the circuit.

For a typical supercharged vehicle, the intake charge may only require cooling under periods of sustained supercharger boost. Thus, the bulk temperature of the coolant is typically relatively cool. The intercooler coolant reservoir 46 provides a larger overall coolant volume and thus a greater thermal mass at this relatively cool temperature. Consequently, the reservoir 46 adds short-term thermal capacity (and thus thermal inertia) to the intercooler system 28, slowing the rate of climb of the coolant temperature. This allows for a reduction in peak temperatures for the charged intake air during wide open throttle operation, which typically only occurs for short periods of time. Reducing the peak temperature for the charged intake air allows for a more dense air/fuel charge in the cylinders, resulting in more vehicle power. The reduced peak temperature may also allow for a more aggressive spark advance, which may lead to greater power output. The short term increase in cooling capacity of the intercooler system 28 is accomplished without the need to increase the size of the ICHE 38. This avoids increasing the air flow restriction for air flowing into the CRFM 54, which may help to maintain better air flow through a radiator and condenser.

Figure 3:
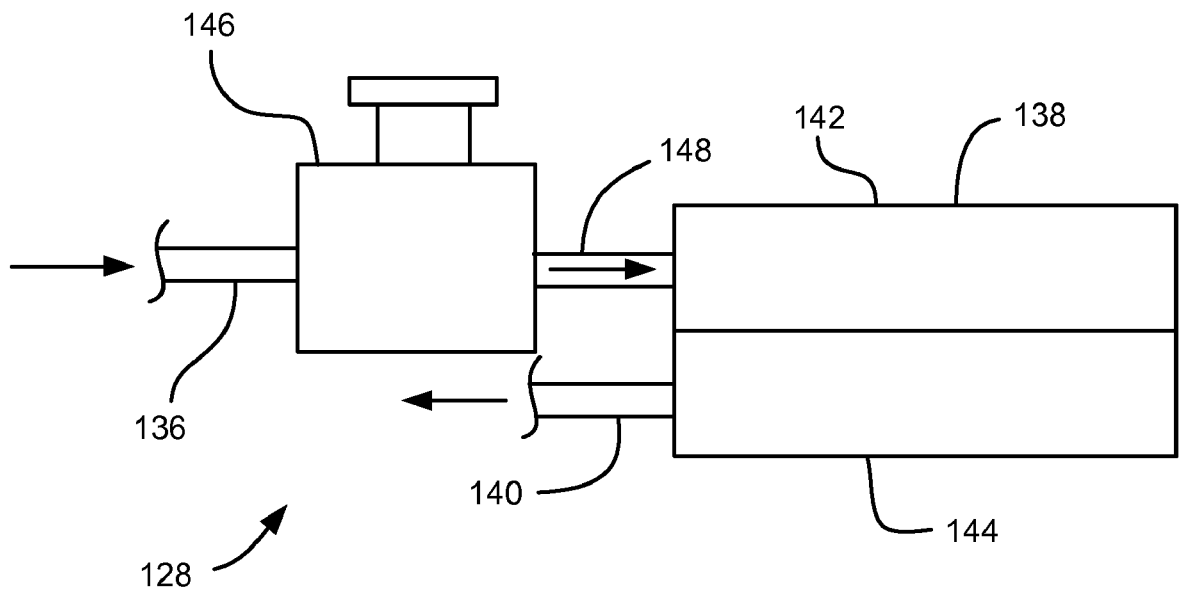
FIG. 3 is a view similar to FIG. 2, but illustrating a second embodiment.

FIG. 3 illustrates a second embodiment. Since this embodiment is similar to the first, similar element numbers will be used for similar elements, but employing 100-series numbers. In this embodiment, an intercooler coolant reservoir 146 is located upstream of an ICHE 138 rather than at a location that is mid-flow through the ICHE 138. The coolant flows in this intercooler system 128 through a manifold-to-reservoir coolant line 136, through the reservoir 146, and through a reservoir-to-heat exchanger coolant line 148 into an upper portion 142 of the ICHE 138. The coolant then flows through the upper portion 142, through the lower portion 144 and out through a heat exchanger-to-pump coolant line 140 to an intercooler pump (not shown in this embodiment). Preferably, the reservoir 146 is located so that it does not inhibit air flow into a condenser, radiator, fan module (not shown in this embodiment).

Figure 4:
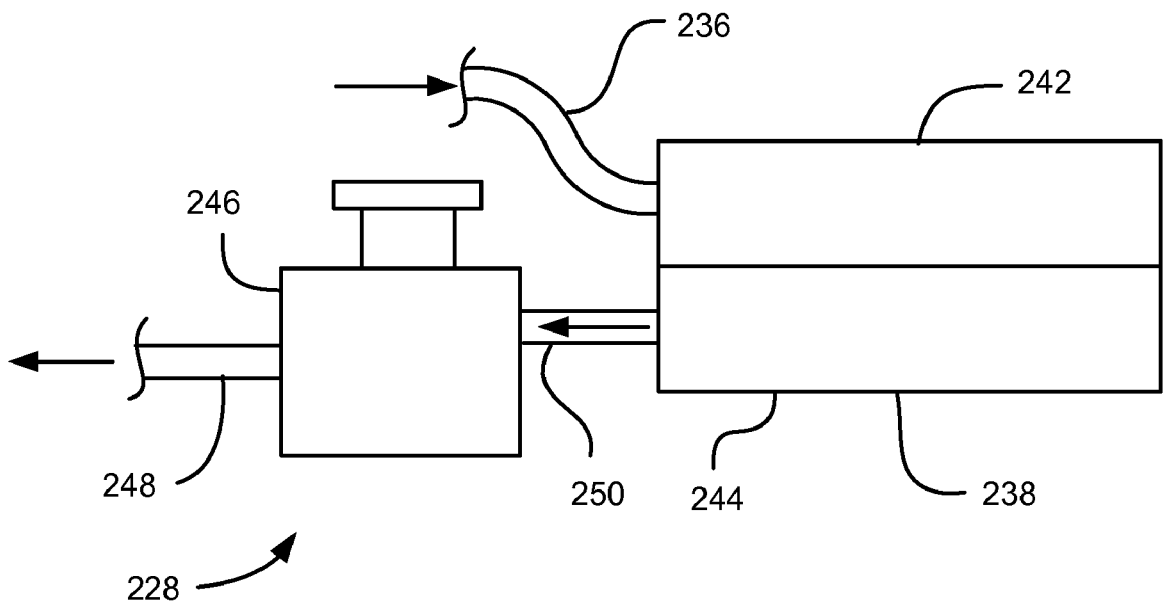
FIG. 4 is a view similar to FIG. 2, but illustrating a third embodiment.

FIG. 4 illustrates a third embodiment. Since this embodiment is similar to the first, similar element numbers will be used for similar elements, but employing 200-series numbers. In this embodiment, an intercooler coolant reservoir 246 is located downstream of an ICHE 238 rather than at a location that is mid-flow through the ICHE 238. The coolant flows in this intercooler system 228 through a manifold-to-heat exchanger coolant line 236 into an upper portion 242 of the ICHE 238. The coolant then flows through the upper portion 242, through the lower portion 244 and out through a heat exchanger-to-reservoir coolant line 250 to the reservoir 246. From the reservoir 246, the coolant flows through a reservoir-to-pump coolant line 248 to an intercooler pump (not shown in this embodiment). The reservoir 246 can be packaged wherever there is sufficient space and room to route the coolant lines. Preferably, the reservoir 246 is located low enough vertically to allow for good coolant fill and de-aeration of the coolant, which is preferable for the first two embodiments as well.

While certain embodiments of the present invention have been described in detail, those familiar with the art to which this invention relates will recognize various alternative designs and embodiments for practicing the invention as defined by the following claims.

What is claimed is:

1. A method of cooling charged intake air entering an internal combustion engine, the method comprising the steps of:
   (a) transferring heat from the charged intake air to a coolant flowing through a first heat exchanger;
   (b) transferring heat from the coolant flowing through a second heat exchanger to surrounding air;
   (c) pumping the coolant through an intercooler pump; and
   (d) receiving, storing and discharging the coolant from an intercooler coolant reservoir by directing the coolant flowing from the first heat exchanger into a first portion of the second heat exchanger, directing the coolant flowing from the first portion into a second portion of the second heat exchanger, and directing the coolant flowing from the second portion into the intercooler coolant reservoir.

2. An intercooler system for use with an air charging system for an internal combustion engine, the intercooler system comprising:
   an intercooler pump for pumping a coolant through the intercooler system;
   a first heat exchanger configured to transfer heat from charged intake air to the coolant;
   a second heat exchanger configured to transfer heat from the coolant to outside air;
   an intercooler coolant reservoir configured to contain the coolant therein;
   a plurality of coolant lines configured to direct a flow of the coolant through the intercooler pump, the first heat exchanger, the second heat exchanger and the intercooler coolant reservoir; and
   wherein the second heat exchanger includes a first portion and a second portion and the plurality of coolant lines includes a first coolant line that is configured to direct the coolant from the intercooler coolant reservoir to the first portion and a second coolant line that is configured to direct the coolant from the second portion to the intercooler pump.

3. The intercooler system of claim 1 wherein the intercooler coolant reservoir is configured to avoid inhibiting air flow into a condenser, radiator, fan module.

4. The intercooler system of claim 1 wherein the intercooler coolant reservoir includes a fill cap and is positioned relative to the second heat exchanger to allow for de-aeration of the coolant.

5. An intercooler system for use with an air charging system for an internal combustion engine, the intercooler system comprising:
   an intercooler pump for pumping a coolant through the intercooler system;
   a first heat exchanger configured to transfer heat from charged intake air to the coolant;
   a second heat exchanger, configured to transfer heat from the coolant to outside air, including a first portion and a second portion;
   an intercooler coolant reservoir configured to contain the coolant therein; and
   a plurality of coolant lines configured to direct a flow of the coolant and including a first coolant line connecting the first heat exchanger to the first portion, a second coolant lined connecting the first portion to the reservoir, a third coolant line connecting the reservoir to the second portion, a fourth coolant line connecting the second portion to the intercooler pump, and a fifth coolant line connecting the pump to the first heat exchanger.

6. The intercooler system of claim 5 wherein the intercooler coolant reservoir is configured to avoid inhibiting air flow into a condenser, radiator, fan module.

7. The intercooler system of claim 5 wherein the intercooler coolant reservoir includes a fill cap and is positioned relative to the second heat exchanger to allow for de-aeration of the coolant.

* * * * *